United States Patent [19]

Ballmer

[11] Patent Number: 4,531,814
[45] Date of Patent: Jul. 30, 1985

[54] METHOD AND APPARATUS FOR TEMPORARILY INCREASING THE ABSORPTANCE OF OPTICAL TRANSMITTING COMPONENTS

[75] Inventor: Horst Ballmer, Heidenheim, Fed. Rep. of Germany

[73] Assignee: Carl-Zeiss-Stiftung, Oberkochen, Fed. Rep. of Germany

[21] Appl. No.: 435,062

[22] Filed: Oct. 18, 1982

[30] Foreign Application Priority Data

Oct. 29, 1981 [DE] Fed. Rep. of Germany ....... 3142908

[51] Int. Cl.³ ............................ G02F 1/01; G02C 7/10
[52] U.S. Cl. ..................................... 350/355; 351/44; 351/158
[58] Field of Search ................ 350/355, 357; 351/44, 351/47, 48, 158

[56] References Cited

U.S. PATENT DOCUMENTS 3,630,603  2/1966  Letter .................... 350/357

Primary Examiner—Bruce Y. Arnold
Attorney, Agent, or Firm—Hopgood, Calimafde, Kalil, Blaustein & Judlowe

[57] ABSTRACT

An electrochromic layer is applied to optical transmitting components, and electric-circuit connection to the layer enables temporary increase and decrease in the absorptance of the component. To increase the absorptance, a well-defined quantity of charge is supplied to the electrochromic layer; and to restore the initial condition, a well-defined quantity of charge is removed from the layer. Preferred fields of use are lenses, particularly eyeglass lenses, filters, and dimmable mirrors.

15 Claims, 2 Drawing Figures

METHOD AND APPARATUS FOR TEMPORARILY INCREASING THE ABSORPTANCE OF OPTICAL TRANSMITTING COMPONENTS

BACKGROUND OF THE INVENTION

The present invention relates to a method and apparatus for temporarily increasing the absorptance of optical transmitting components, such as lenses and filters.

Optical transmitting components of variable absorptance are used in many fields of optics. One known example is eyeglass lenses which are to serve temporarily also as sunglasses. So-called phototropic glasses are known for this purpose; they become darker in bright sunlight due to the ultraviolet content thereof and thereby protect the eye from excessive or unpleasant brightness. These phototrophic glasses, however, have the disadvantage that their change in absorptance takes place too slowly and that they function inadequately behind the windshields of automobiles.

Optical transmitting components of temporarily variable absorptance are furthermore advantageous for numerous optical instruments. Thus, for example, it is frequently necessary temporarily to weaken a light ray to a predetermined extent. For this, so-called gray or neutral filters are used; they are generally moved by mechanical means into and out of the path of the ray. But use of such mechanical means has the disadvantage that automating is expensive and is disturbance-prone, due to the involved mechanical motion of involved parts.

BRIEF STATEMENT OF THE INVENTION

The object of the invention is to provide a method and apparatus with which it is possible to increase the absorptance of optical transmitting components, such as lenses and filters, temporarily and in a defined manner with sufficient speed, without having to move mechanical parts and without dependence on special environmental conditions (as in the case of phototropic glasses).

The invention achieves this object by applying an electrochromic layer to the optical component and by supplying a predetermined quantity of charge to the electrochromic layer in order to increase its absorptance (coloring), and by removing a predetermined quantity of charge from the layer in order to restore its initial condition (decoloring).

One suitable embodiment of the invention is characterized by the fact that the coloring and decoloring processes are initiated via a flip-flop circuit, that during a given coloring or decoloring process of the electrochromic layer, charges are supplied to and removed from two sources of limitable current while counting pulses are sent by a clock generator to a counter and that the counter, upon reaching defined values, interrupts the coloring and decoloring process via the flip-flop circuit.

One advantageous embodiment is characterized by the fact that the electrochromic layer is connected to two sources of limitable current via which charges are supplied and removed (as the case may be), that the switch inputs of the current sources are connected via gates to the outputs of a flip-flop circuit and to the highest-order output of a counter, that the flip-flop circuit is connected via a flank-differentiating circuit to the second highest-order output of the counter, that the output of the flip-flop circuit is connected to a clock generator which delivers counting pulses to the counter during a coloring or decoloring process, and that the flip-flop circuit is connected to a key for initiating a coloring or decoloring process.

Known electrochromic layers, which have thus far been used only as display elements, consume current only during a change in their absorptance; this modest current consumption is particularly advantageous for use of the present invention in portable devices such as sunglasses.

In another aspect of the invention, the decoloring current is less than the coloring current, thereby accounting for the fact that more charge is required for coloring of an electrochromic layer than can be removed in the decoloring process.

In a preferred feature, transistors used as the current sources are controlled via base resistors in their emitter circuits.

In applying the invention to eyeglasses, it is advantageous to provide a contact sensor as the key afor initiating the coloring or decoloring process and to employ electronic components using thick-film or integrated-circuit techniques. Such components can then be installed in the eyeglass frame, along with the batteries required for supply of current.

In one particularly advantageous aspect of the invention, the coloring and decoloring processes are triggered by an optical sensor, and a circuit characterized by hysteresis is operative, for variations around the switch point, to preclude too-frequent change of color state.

DETAILED DESCRIPTION

Figure 1:
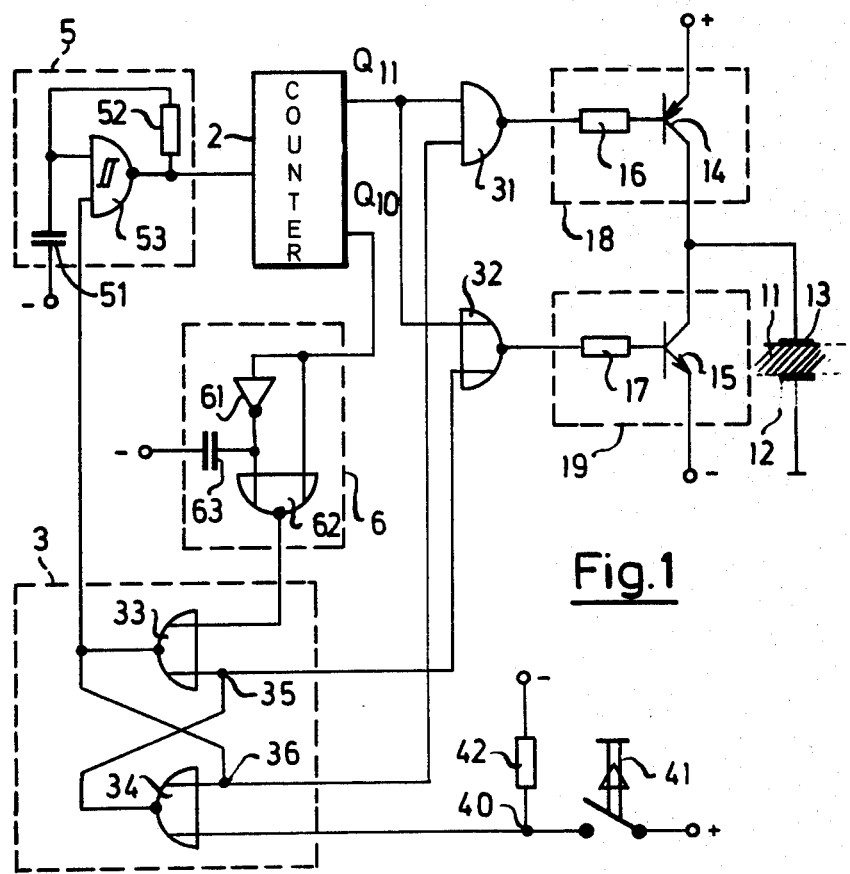
Figure 2:
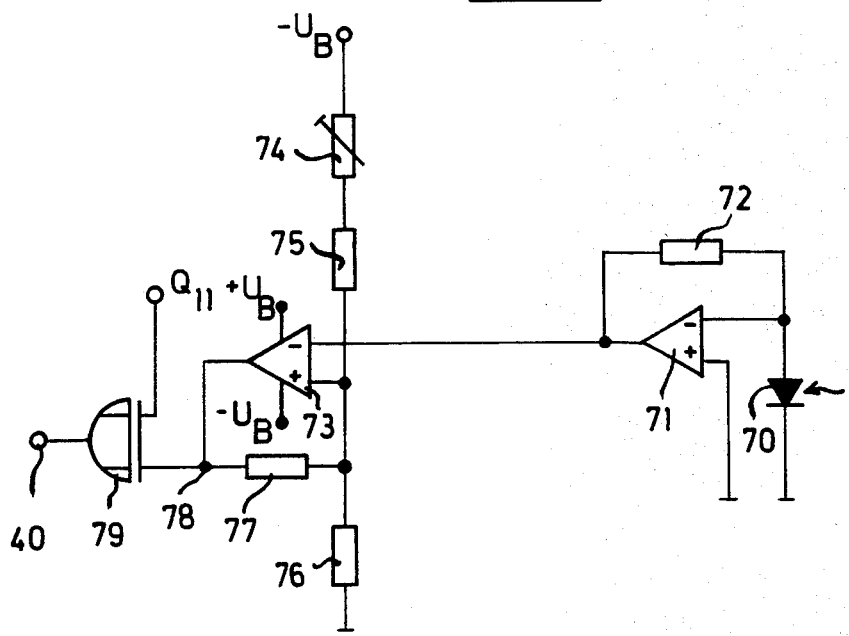

The invention will be described in further detail in reference to the accompanying drawings, in which:

FIG. 1 is a diagram schematically showing an illustrative circuit for the supply and removal of charges for the coloring and decoloring processes, respectively, the processes being triggered by a key; and FIG. 2 is a similar diagram to illustrate a circuit for triggering the coloring processes by an optical sensor.

In FIG. 1, 11 identifies an electrochromic layer which will be understood to have been applied to a lens or some other optical component (not shown). One electrode 12 of the electrochromic layer lies at zero potential; the other electrode 13 is connected to sources of current 18 and 19. The limitable-current sources 18 and 19 consist of a PNP transistor 14 and an NPN transistor 15, these transistors being connected, via their emitters, with the positive and negative terminals of a source of voltage and, via their common junction point, to the electrochromic layer. Transistors 14 and 15 are controlled via base resistors 16 and 17 whose value, solely via the current gain of the transistors, provides a safety limit of charging and discharging current for the electrochromic layer. During a coloring process, the NPN transistor 15 is driven; and during a decoloring process, the PNP transistor 14 is driven.

Coloring and decoloring currents for the electrochromic layer 11 are connected and disconnected by supplying the output value of a counter 2 and the condition of the flip-flop 3 to a NAND gate 31 and to a NOR gate 32, respectively.

Counter 2 is connected to a clock generator 5 in which the clock signal, which forms the time-controlled basis of the charge, is produced by a capacitor 51, a resistor 52 and a Schmitt-trigger NAND gate 53. The circuit of FIG. 1 additionally contains a flank-differentiating circuit 6 for termination of a coloring or decoloring process, and a key 41 for initial triggering thereof.

After connection of the voltage supply (not shown), the counter 2 is first set (by known means not shown in the drawing) with its highest-order output $Q_{11}$ at "1" or "H" and with all other outputs at "∅" or "L". This condition characterizes the completely decolored state of the electrochromic layer; after connection of the voltage supply, this state is first of all assumed, so that the electrochromic layer—regardless of the condition in which it happens to be—will be completely decolored. Thus, after connection of the voltage supply, the $Q_{11}$ input to gates 31 and 32 is at "H".

The flip-flop 3, which consists of cross-connected NOR gates 33 and 34, can assume two different states which are characterized, for example, at one output-circuit point 36 by "L" or "H", the other output-circuit point 35 being understood always to have the inverted state. If "∅" is present at circuit point 36, then the electrochromic layer is not changed.

Once the current supply has been turned on, either of the two states ("L" or "H") may be present at point 36. If "H" is present, then both inputs of NAND gate 31 are at "H", and the electrochromic layer is immediately decolored via operation of transistor 14. If "∅" is present at point 36, then the first actuation of key 41 produces at the output of NOR gate 34 the condition of "∅" and thus also "∅" at the related input of NOR gate 33. Since the second input of gate 33 is always "∅" as long as counter 2 is not operating, "1" is produced at the output of gate 33 and thus "H" at the circuit point 36. This state remains for the time being independently of further actuation of key 41. If therefore, upon connection of the current supply, the electrochromic layer is not immediately decolored and thus actuation of key 41 remains without effect, the first actuation of key 41 produces a decoloring process.

When the circuit point 36 is at "H", the clock generator 5 is activated to deliver counting pulses to counter 2. The latter counts upward until all outputs have the value "1". The next connecting pulse causes all outputs to assume the value "∅". Thus, for the first time since initiation of the decoloring process, the value at the second-highest-order output $Q_{10}$ changes from "1" to "518". This negative-going flank is differentiated by a flank-differentating circuit 6, comprising an inverter 61, a capacitor 63, and a NOR gate 62; and a short "H pulse" is thereby produced at the output of the NOR gate 62. This short pulse restores flip-flop 3 to the condition at which "L" ("∅") is at circuit point 36. The clock generator 5 is stopped, and the current source 18 becomes passive. The state of the counter at which all outputs are at "∅" therefore represents the decolored state of the electrochromic layer.

Only in this condition of the flip-flop 3 can actuation of key 41 again have an effect. Upon such key actuation, circuit point 36 again becomes "H", and circuit point 35 again becomes "L". Since the output $Q_{11}$ now, however, has the value "∅" or "L", two unequal signals are present at NAND gate 31, so that the source of current for decoloration is not activated. On the other hand, both inputs at NOR gate 32 are now "L", so that the source of current for coloring is activated. At the same time, the clock generator is again placed in operation, and the counter continues to count upward until all outputs, with the exception of highest-order output $Q_{11}$, have assumed the value "1". The next counting pulse causes the highest-order output $Q_{11}$ to become "1" and all other outputs become "∅". Thus, the second-highest-order output $Q_{10}$ changes from "1" to "∅", for the first time since the start of the coloring process. A short "H" signal is thus again produced at the output of the flank-differentiating circuit 6, and this short signal resets flip-flop 3 and thus turns off both the coloring process and the clock generator 5. The system is now once more in a condition of rest, in readiness for the next actuation of key 41, which again results in a decoloring process since the output $Q_{11}$ of counter 2 is again at "H".

FIG. 2 illustrates a particularly advantageous circuit-keying feature of the invention, being adapted for connection at circuit point 40 of FIG. 1, in place of key 41 and resistor 42. By using the circuit-keying arrangement of FIG. 2, the state of the electrochromic layer is automatically adjusted as a function of brightness measured by an optical sensor 70, which may, for example, be a pin diode or a phototransistor. Signal output of the sensor is first amplified by an operational amplifier 71 connected to a resistor 72. A succeeding operational amplifier 73 is connected as a comparator, wherein hysteresis behavior is obtained by bias voltage taken from a voltage divider (consisting of resistors 74, 75, 76), with comparator output appearing across a resistor 77. The threshold of switch action and, therefore, hysteresis in comparator 73, may be adjusted by resistor 74. In this connection, the switch threshold U is given by $$U = \frac{R_{77}R_{76}}{R_{77}R_{76} + (R_{75} + R_{74})(R_{77} + R_{76})} U_B$$

and the width of the hyseteresis $\pm \alpha U$ by $$\pm \Delta U = U^{\pm} \frac{(R_{74} + R_{75})R_{76}}{(R_{74} + R_{76})R_{76} + R_{77}(R_{75} + R_{74} + R_{76})} U_B$$

These equations apply for symmetrical operating voltages on the operational amplifier 73. It is, of course, also possible to select these operating voltages for asymmetry, in which case the equations must be modified accordingly.

The output signal of the comparator, at circuit point 78, is "H" when the electrochromic layer is to be colored; otherwise it is "L". It is therefore coupled by a exclusive-OR gate 79 to the highest-order output signal $Q_{11}$ of counter 2 which, as described above, indicates the color state of the electrochromic layer. The output of gate 79 becomes "H" and thus triggers a coloring or decoloring process only when the output signal of the comparator does not agree with the highest-order output of counter 2. And, in the same way as in the case of the key 41 in FIG. 1, the action of flip-flop 3 is to initiate a new coloring or decoloring process only after the previous process has been concluded. The hysteresis effect of the described circuit will be understood to preclude unnecessary control processes when incident radiation on the optical sensor undergoes small changes in the vicinity of the switch threshold.

Sunglasses, particularly those of optical effect, provide an important field of use for the described circuit arrangements. For those persons who wear glasses, it is advantageous that the glasses which correct their imperfect vision shall at the same time also be sunglasses. The described arrangements have the advantage over the previously known phototropic glasses that the electrochromic layers are colored and decolored with substantially greater speed. Furthermore, they can even function behind the windshields of automobiles. Using the arrangement of FIG. 1, the glasses can be equipped with a switch for initiating coloring or decoloring processes. This switch may illustratively take the form of a touch-sensitive contact sensor which is seated at the free end of a temple piece. The entire electronic system is adversely developed using thick-film or integrated-circuit techniques, so that it can be arranged in the eyeglass frame together with batteries needed for current supply. For the described embodiment, current consumption is so slight when coloring or decoloring is not taking place that it is unnecessary to disconnect the battery in periods when the glasses are not being used.

The arrangement of FIG. 2 is particularly advantageous for sunglasses, since the correct absorptance condition is automatically produced in response to intensity of radiation incident on the optical sensor. The advantage when traveling by car through tunnels, as well as upon entering or leaving a building, etc., is obvious.

Another field of use of the described arrangements consists of optical instruments in which a ray path must be temporarily weakened in a predetermined manner. Thus, for instance, it is desirable in the case of microscopes for the image to have particularly the same brightness, even for different degrees of magnification. For this purpose, a flat glass plate bearing an electrochromic layer is suitably disposed in the ray path of the microscope, and its absorptance is changed by one of the described circuit arrangements. Thus, for example, momentary key action at 41 can be actuated directly by the magnification changer or by the lens turret of the microscope. And in microscopes having zoom magnification, automatic switching by an optical sensor, as described in connection with FIG. 2, is particularly advantageous. In all cases, it will be understood that the electrochromic layer can alternatively be applied to an existing optical component of the microscope.

As a further field of use, the invention may be applied to optical arrangements in which a difference in reflecting power can be replaced by a difference in absorptive power. Dimmable automobile rearview mirrors provide one such example. Conventional dimmable rearview mirrors comprise a glass plate and a mirror behind the plate, the mirror being swung away in the event of too strong an incidence of light. However, this solution has its disadvantages: the mirror must be swung away by hand, which is possible at slight mechanical expense only in the case of inside mirrors, and automation is possible only at relatively great expense. On the other hand, with the present invention, difference in reflective power can be obtained by a (stationary) glass plate which is mirror-reflecting at its rear surface, and with an electrochromic layer applied to its front surface. With the arrangements described in connection with FIG. 1, a temporary anti-dazzle effect can be obtained by key actuation, and this is of particular advantage in the case of outside mirrors, since the key (41) can be located completely independently of (i.e., remote from) the mirror. With the further development described in FIG. 2 dimming and the removal of dimming are performed automatically, thereby relieving the driver of the need to make any change in reflective properties.

What is claimed is:

1. Apparatus for charge control of an electrochromic layer, said layer being uncolored for the condition of no charge in said layer and said layer being in a predetermined colored state for a predetermined charge in said layer, said apparatus comprising: said layer; and control means for changing from one to the other of said states; said control means including first limited-current means connected to charge said layer and second limited-current means connected to discharge said layer, actuating means including a flip-flop circuit for initiating a change from one to the other of said colored and uncolored states, timing means connected (a) to initiate a predetermined timed interval in response to said actuating means and (b) to return said flip-flop circuit to said one state thereof upon completion of the timed interval, and gating means connected to said flip-flop circuit and operative (a), in the uncolored state of said layer, to operate said first limited-current means for charging said layer during said interval upon operation of said actuating means and (b), in the colored state of said layer, to operate said second limited-current means for discharging said layer during said interval upon operation of said actuating means.

2. Apparatus according to claim 1, in which said timing means comprises a clock-pulse generator, and a pulse counter which produces an output signal at the conclusion of a predetermined count of clock pulses.

3. Apparatus according to claim 1, in which said timing means comprises a clock-pulse generator and a pulse counter connected to initiate a counting in response to operation of said actuating means, said pulse counter having a first output producing a first output signal if said layer is being colored and having a second output produced a second output signal if said layer is being uncolored.

4. Apparatus according to claim 3, in which said counter is a binary counter of plural orders to achieve the predetermined count, the first output of said counter being at the highest order of said predetermined count, and the second output of said counter being at the second-highest order of said predetermined count, and means connected to said second output and to said flip-flop circuit for terminating a count in response to a change in the signal of said second output.

5. Apparatus according to claim 4, and further including a flank-differentiating circuit connected to the second output of said counter output for generating a count-terminating pulse in response to a change in the output signal of said second output.

6. Apparatus according to claim 1, in which each of said limited-current means includes its own current-limiting device whereby the timing of said interval of charging current may be as appropriate for achieving a predetermined coloring state in said layer, and further whereby the same timing of discharging current may be as appropriate for achieving the uncolored state of said layer.

7. Apparatus according to claim 6, in which the limited current of said second limited-current means is less than the limited current of said first limited-current means.

8. Apparatus according to claim 1, in which each of said first and second limited-current means comprises a transistor controlled by a base resistor and wherein the transistor emitters are adapted for connection to the respective poles of a voltage source.

9. Apparatus according to claim 1, in which said actuating means includes selectively operable key means.

10. Apparatus according to claim 1, in which said actuating means includes optical-sensor means which produces an electrical output signal in response to light, and a threshold device which produces a first output signal for brightness levels below a predetermined threshold and a second output signal for brightness levels above said threshold.

11. Apparatus according to claim 10, in which said threshold device includes an operational amplifier.

12. Apparatus for the selective coloring and decoloring of sunglass spectacles having two lens elements, wherein each of said lens elements includes an electrochromic layer which is in an uncolored state for the condition of no charge in the layer, and which is in a predetermined colored state for a predetermined charge in the layer, said apparatus comprising: said layers; and control means operative upon both said layers for changing both said layers from one to the other of said states; said control means including first limited-current means connected to charge said layers and second limited-current means connected to discharge said layers, actuating means including a flip-flop circuit for initiating a change from one to the other of said colored and uncolored states, timing means connected (a) to initiate a predetermined timed interval in response to said actuating means and (b) to return said flip-flop circuit to said one state thereof upon completion of the timed interval, and gating means connected to said flip-flop circuit and operative (a), in the uncolored state of said layer, to operate said first limited-current means for charging said layer during said interval upon an operation of said actuating means and (b), in the colored state of said layer, to operate said second limited-current means for discharging said layer during said interval upon an operation of said actuating means.

13. Apparatus according to claim 12, wherein said control means includes a battery source.

14. Apparatus for the selective coloring and decoloring of an optical microscope containing an electrochromic layer as an element of the optical system of the microscope, said layer being an uncolored state for the condition of no charge in said layer, said layer being in a predetermined colored state for a predetermined charge in said layer, said apparatus comprising: said layer; and control means for changing from one to the other of said states; said control means including first limited-current means connected to charge said layer and second limited-current means connected to discharge said layer, actuating means including a flip-flop circuit for initiating a change from one to the other of said colored and uncolored states, timing means connected (a) to initiate a predetermined timed interval in response to said actuating means and (b) to return said flip-flop circuit to said one state thereof upon completion of the timed interval, and gating means connected to said flip-flop circuit and operative (a), in the uncolored state of said layer, to operate said first limited-current means for charging said layer during said interval upon an operation of said actuating means and (b), in the colored state of said layer, to operate said second limited-current means for discharging said layer during said interval upon an operation of said actuating means; said actuating means including optical-sensor means which produces an electrical output signal in response to light and which is positioned to monitor brightness of the viewing field of the microscope, and a threshold device which produces a first output signal for brightness levels below a predetermined threshold and a second output signal for brightness levels above said threshold, said threshold device being set at a predetermined level of viewing the field with approximately identical image brightness upon different magnification via the optical system.

15. Apparatus for selective coloring and decoloring of an automobile rear-view mirror wherein an electrochromic layer is a part of the mirror, said layer being in uncolored state for the condition of no charge in said layer, said layer being in a predetermined colored state for a predetermined charge in said layer, said apparatus comprising: said layer; and control means for changing from one to the other of said states; said control means including first limited-current means connected to charge said layer and second limited-current means connected to discharge said layer, actuating means including a flip-flop circuit for initiating a change from one to the other of said colored states, timing means connected (a) to initiate a predetermined timed interval in response to said actuating means and (b) to return said flip-flop circuit to said one state thereof upon completion of the timed interval, and gating means connected to said flip-flop circuit and operative (a), in the uncolored state of said layer, to operate said first limited-current means for charging said layer during said interval upon an operation of said actuating means and (b), in the colored state of said layer, to operate said second limited-current means for discharging said layer during said interval upon an operation of said actuating means.

* * * * *